(12) United States Patent
Wu et al.

(10) Patent No.: US 12,507,272 B2
(45) Date of Patent: Dec. 23, 2025

(54) CHANNEL STATE INFORMATION REFERENCE SIGNAL INDICATING METHOD AND DEVICE

(71) Applicant: VIVO MOBILE COMMUNICATION CO., LTD., Guangdong (CN)

(72) Inventors: Kai Wu, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 315 days.

(21) Appl. No.: 17/849,560

(22) Filed: Jun. 24, 2022

(65) Prior Publication Data

US 2022/0330260 A1   Oct. 13, 2022

Related U.S. Application Data

(63) Continuation of application No. PCT/CN2020/137909, filed on Dec. 21, 2020.

(30) Foreign Application Priority Data

Dec. 25, 2019   (CN) .......................... 201911358718.7

(51) Int. Cl.
*H04W 72/542*   (2023.01)
*H04L 1/00*   (2006.01)
(Continued)

(52) U.S. Cl.
CPC ......... *H04W 72/542* (2023.01); *H04L 5/0048* (2013.01); *H04W 68/005* (2013.01); *H04W 72/0446* (2013.01); *H04W 72/23* (2023.01)

(58) Field of Classification Search
CPC . H04W 72/0446; H04W 72/20; H04W 72/23; H04W 72/54; H04W 68/005; H04L 5/0048; H04L 5/005; H04L 5/0051
See application file for complete search history.

(56) References Cited

U.S. PATENT DOCUMENTS

2013/0010707 A1* 1/2013 Gaal ..................... H04W 68/00
                                                          370/329
2013/0308607 A1* 11/2013 Abe ..................... H04B 17/318
                                                          370/332
(Continued)

FOREIGN PATENT DOCUMENTS

CN          103108405 A        5/2013
CN          103391153 A        11/2013
(Continued)

OTHER PUBLICATIONS

First Office Action for Chinese Application No. 201911358718.7, dated Nov. 29, 2021, 8 Pages.
(Continued)

*Primary Examiner* — Jenee Holland
(74) *Attorney, Agent, or Firm* — BROOKS KUSHMAN P.C.

(57) ABSTRACT

A CSI-RS indicating method and a device are provided. The method includes: receiving paging DCI, wherein the paging DCI indicates one or more of the following: whether to transmit CSI-RS; whether to update CSI-RS configuration information; and whether to update system information, the system information including the CSI-RS configuration information. In the embodiment of the present disclosure, a terminal can determine whether to transmit CSI-RS or whether to update CSI-RS configuration information according to the received paging DCI; in a case that the paging DCI indicates to transmit CSI-RS, the terminal receives the CSI-RS; and in a case that the paging DCI indicates to update the CSI-RS configuration information, the terminal acquires updated CSI-RS configuration information and receives CSI-RS according to the updated CSI-RS configuration information.

16 Claims, 3 Drawing Sheets

(51) Int. Cl.
  *H04L 5/00* (2006.01)
  *H04W 68/00* (2009.01)
  *H04W 68/02* (2009.01)
  *H04W 72/0446* (2023.01)
  *H04W 72/23* (2023.01)
  *H04W 72/232* (2023.01)

(56) References Cited

U.S. PATENT DOCUMENTS

| | | | |
|---|---|---|---|
| 2015/0195731 A1 | 7/2015 | Jung et al. | |
| 2016/0105817 A1* | 4/2016 | Frenne | H04L 1/0026 370/252 |
| 2017/0105166 A1* | 4/2017 | Lee | H04W 48/12 |
| 2017/0250781 A1* | 8/2017 | Golitschek Edler Von Elbwart | H04W 28/04 |
| 2017/0366377 A1 | 12/2017 | Papasakellariou | |
| 2018/0227031 A1* | 8/2018 | Guo | H04W 24/10 |
| 2018/0227156 A1* | 8/2018 | Papasakellariou | H04W 72/0453 |
| 2018/0278317 A1 | 9/2018 | Onggosanusi et al. | |
| 2019/0110309 A1* | 4/2019 | Xu | H04L 5/0055 |
| 2019/0141546 A1* | 5/2019 | Zhou | H04L 5/001 |
| 2019/0174440 A1* | 6/2019 | Kwak | H04W 56/001 |
| 2019/0191457 A1 | 6/2019 | Si et al. | |
| 2019/0320455 A1* | 10/2019 | Chen | H04L 5/001 |
| 2019/0357221 A1* | 11/2019 | Davydov | H04L 5/0064 |
| 2020/0059891 A1* | 2/2020 | Huang | H04W 72/30 |
| 2020/0067631 A1 | 2/2020 | Kakishima et al. | |
| 2021/0058214 A1 | 2/2021 | Chen et al. | |
| 2021/0105739 A1* | 4/2021 | Lin | H04W 72/0446 |
| 2023/0032154 A1* | 2/2023 | Hwang | H04W 76/20 |
| 2023/0171810 A1* | 6/2023 | Belleschi | H04W 74/0833 370/329 |
| 2024/0089053 A1* | 3/2024 | Wang | H04L 5/0094 |

FOREIGN PATENT DOCUMENTS

| | | |
|---|---|---|
| CN | 107231657 A | 10/2017 |
| CN | 108668300 A | 10/2018 |
| CN | 108811083 A | 11/2018 |
| CN | 110475340 A | 11/2019 |
| CN | 110521252 A | 11/2019 |
| CN | 110582977 A | 12/2019 |
| WO | 2017026863 A1 | 2/2017 |
| WO | 2018233587 A1 | 12/2018 |
| WO | 2021071261 A1 | 4/2021 |

OTHER PUBLICATIONS

International Search Report and Written Opinion for Application No. PCT/CN2020/137909, dated Mar. 24, 2021, 9 Pages.
First Office Action for Indian Application No. 202227042237, dated Nov. 15, 2022, 6 Pages (including English Translation).
Extended European Search Report for Application No. 20907730.4-1213, dated Nov. 30, 2022, 8 Pages.
Samsung, "Summary for TRS/CSI-RS Occasion(s) for idle/inactive UEs," 3GPP TSG RAN WG1 #102-e Phase I, Agenda item 8.7.1.2, Aug. 17-28, 2020, R1-200xxxx, e-Meeting, 17 Pages.
Samsung, "Summary for TRS/CSI-RS Occasion(s) for idle/inactive UEs," 3GPP TSG RAN WG1 #102-e Phase II, Agenda item 8.7.1.2, Aug. 17-28, 2020, R1-200xxxx, e-Meeting, 24 Pages.
Samsung, "Summary for TRS/CSI-RS Occasion(s) for idle/inactive UEs," 3GPP TSG RAN WG1 #102-e Phase III, Agenda item 8.7.1.2, Aug. 17-28, 2020, R1-200xxxx, e-Meeting, 24 Pages.
Catt, "Corrections to NR PDCCH," 3GPP TSG RAN WG1 #94, Agenda item 7.1.3.1, Aug. 20-24, 2018, R1-1808378, Gothenburg, Sweden, 8 Pages.
Vivo, "UE Power Consumption Reduction in RRM Measurement," 3GPP TSG RAN WG1 #97, Agenda item 7.2.9.3, May 13-17, 2019, R1-1906174, Reno, Nevada, US, 7 Pages.
Huawei et al., "Coexistence and Channel Access for NR Unlicensed Band Operations," 3GPP TSG RAN WG1 #99, Agenda item 7.2.2.2.1, Nov. 18-22, 2019, R1-1911866, Reno, Nevada, US, 18 Pages.
Vivo, "Remaining Aspects of PDCCH-based Power Saving Signal," 3GPP TSG RAN WG1 #99, Agenda item 7.2.9.1, Nov. 18-22, 2019, R1-1912049, Reno, Nevada, US, 11 Pages.
Vivo, "Summary for TRS/CSI-RS Occasion(s) for idle/inactive UEs," 3GPP TSG RAN WG1 #102-e, Agenda item 8.7.1.2, Aug. 17-28, 2020, R1-2005389, e-Meeting, 7 Pages.
Vivo, "Summary for TRS/CSI-RS Occasion(s) for idle/inactive UEs," 3GPP TSG RAN WG1 #103-e, Agenda item 8.7.1.2, Oct. 26-Nov. 13, 2020, R1-2007674, e-Meeting, 9 Pages.
First Office Action for Korean Application No. 10-2022-7025817, dated Nov. 27, 2024, 11 Pages.
Huawei, HiSilicon "PDCCH-based power saving signal/channel" 3GPP TSG RAN WG1 Meeting #98, Prague, Czech Republic, Aug. 2019, R1-1908069, 16 Pages.
Nokia "Introduction of cross-slot scheduling restriction" 3GPP TSG-RAN WG1 Meeting #99, Reno, USA, Nov. 2019, R1-1913208, 9 Pages.
Second European Office Action for Application No. 20907730.4, Mar. 26, 2025, 5 pages.

* cited by examiner

CHANNEL STATE INFORMATION REFERENCE SIGNAL INDICATING METHOD AND DEVICE

CROSS-REFERENCE TO RELATED APPLICATIONS

This application is a continuation of International Application No. PCT/CN2020/137909 filed on Dec. 21, 2020, which claims priority to Chinese Patent Application No. 201911358718.7, filed on Dec. 25, 2019, which are incorporated herein by reference in their entireties.

TECHNICAL FIELD

Embodiments of the present disclosure relate to the technical field of communications, and in particular, to a channel state information reference signal (CSI-RS) indicating method and a device.

BACKGROUND

CSI-RS in the related network belongs to the configuration of a connected state and only can support a terminal in the connected state (for example, user equipment (UE)). CSI-RS can be used for synchronization in the connected state, channel state information (CSI) measurement, radio resource management (RRM) measurement, radio link monitoring, beam failure detection, beam management, automatic gain control (AGC) and the like.

UE in an idle state or an inactive state only can use a synchronization signal and PBCH block (SSB) to perform RRM measurement, synchronization, AGC and the like, and UE in the idle state cannot use CSI-RS to complete synchronization, CSI measurement, RRM measurement, radio link monitoring, beam failure detection, beam management, AGC and the like.

Therefore, how to instruct UE to receive CSI-RS is an urgent problem to be solved.

SUMMARY

One objective of embodiments of the present disclosure is to provide a CSI-RS indicating method and a device.

According to a first aspect, embodiments of the present disclosure provide a CSI-RS indicating method, applied to a terminal. The method includes:
receiving paging DCI, wherein the paging DCI indicates one or more of the following:
whether to transmit CSI-RS;
whether to update CSI-RS configuration information; and
whether to update system information, the system information comprising the CSI-RS configuration information.

According to a second aspect, embodiments of the present disclosure provide a CSI-RS indicating method, applied to a network device. The method includes:
sending paging DCI, wherein the paging DCI indicates one or more of the following:
whether to transmit CSI-RS;
whether to update CSI-RS configuration information; and
whether to update system information, the system information comprising the CSI-RS configuration information.

According to a third aspect, embodiments of the present disclosure provide a terminal, including:
a first receiving module, configured to receive paging DCI, wherein the paging DCI indicates one or more of the following: whether to transmit CSI-RS; whether to update CSI-RS configuration information; and whether to update system information, wherein the system information comprises the CSI-RS configuration information.

According to a fourth aspect, embodiments of the present disclosure provide a network device, including:
a first sending module, configured to send paging DCI, wherein the paging DCI indicates one or more of the following: whether to transmit CSI-RS; whether to update CSI-RS configuration information; and whether to update system information, wherein the system information includes the CSI-RS configuration information.

According to a fifth aspect, embodiments of the present disclosure provide a communication device, including: a processor, a memory, and a program stored in the memory and capable of running on the processor, wherein when the program is executed by the processor, the steps of the CSI-RS indicating method according to the first aspect or the second aspect are implemented.

According to a sixth aspect, embodiments of the present disclosure provide a computer readable storage medium. The computer readable storage medium stores a computer program, and when the computer program is executed by a processor, the steps of the CSI-RS indicating method according to the first aspect or the second aspect are implemented.

In the embodiments of the present disclosure, the terminal may determine whether to update CSI-RS or whether to update CSI-RS configuration information according to the received paging DCI; in a case that the paging DCI indicates to transmit CSI-RS, the terminal may receive the CSI-RS; in a case that the paging DCI indicates to update CSI-RS configuration information, the terminal acquires the updated CSI-RS configuration information and receives CSI-RS according to the updated CSI-RS configuration information, so that after the terminal receives the CSI-RS, the CSI-RS may be used to complete CSI measurement, radio resource management measurement, radio link measurement, beam failure detection, beam management, automatic gain control and the like.

BRIEF DESCRIPTION OF DRAWINGS

It becomes clear for those of ordinary skill in the art to learn various other advantages and benefits by reading detailed description of the following implementation manners. The accompanying drawings are merely used for illustrating the optional implementations, and are not considered as a limitation on the present disclosure. In addition, in all the accompanying drawings, a same reference symbol is used to represent a same part. In the accompanying drawings.

DETAILED DESCRIPTION

Figure 1:
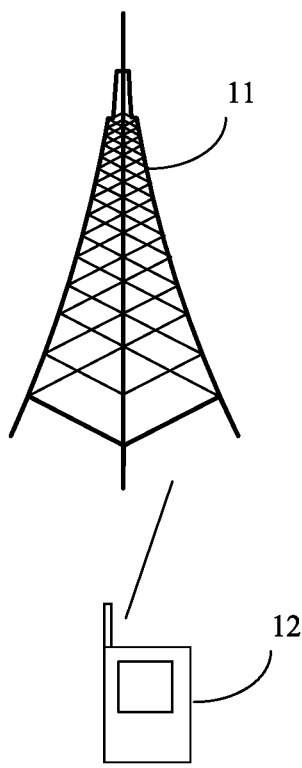
FIG. 1 is a schematic architectural diagram of a wireless communication system according to an embodiment of the present disclosure.

The technical solutions in the embodiments of the present disclosure are described below clearly and completely with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of the present application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects, for example, A and/or B means including A alone, B alone, and both A and B.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The technology described in this specification is not limited to a long term evolution (LTE)/LTE-advanced (LTE-A) system, and may also be used in various wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often exchanged in use. A CDMA system may implement radio technologies such as CDMA2000, universal terrestrial radio access (UTRA) and the like. UTRA includes wideband CDMA (WCDMA) and another CDMA variation. A TDMA system may implement a radio technology such as Global System for Mobile Communication (GSM). The OFDMA system can implement radio technologies such as ultra mobile broadband (Ultra Mobile Broadband, UMB), evolved-UTRA (E-UTRA), IEEE 802.11 (Wi-Fi), IEEE 802.16 (WiMAX), IEEE 802.20, Flash-OFDM and the like. UTRA and E-UTRA are parts of a universal mobile telecommunications system (UMTS). LTE and advanced LTE (for example, LTE-A) are new UMTS versions that use E-UTRA. UTRA, E-UTRA, UMTS, LTE, LTE-A and GSM are described in documents from an organization named "3rd generation partnership project" (3rd Generation Partnership Project, 3GPP). CDMA2000 and UMB are described in a document of an origination named "3rd generation partnership project 2" (3GPP2). The technologies described in the present disclosure may also be used in the foregoing systems and radio technologies, and may also be used in another system and radio technology.

The embodiments of the present disclosure are described below with reference to the accompanying drawings. A CSI-RS indicating method and a device provided by the embodiments of the present disclosure may be applied to a wireless communication system. FIG. 1 is a schematic architectural diagram of a wireless communications system according to an embodiment of the present disclosure. As shown in FIG. 1, the wireless communication system may include: a network device 11 and a terminal 12. The terminal 12 may be denoted as UE 12, and the terminal 12 may communicate (transmit signaling or transmit data) with the network device 11. In a practical application, a connection between the foregoing various devices may be a wireless connection. A solid line is used in FIG. 1 for easy and intuitive presentation of a connection relationship between the various devices.

The network device 11 provided by this embodiment of the present disclosure may be a base station, and the base station may be a commonly used base station, or an evolved node base station (eNB), or a network device (for example, a next generation node base station (next generation node base station, gNB) or a transmission and reception point (TRP)) in a 5G system.

The terminal 12 provided by the embodiments of the present disclosure may be a mobile phone, a tablet computer, a laptop, an ultra-mobile personal computer (UMPC), a netbook or a personal digital assistant (PDA), a mobile Internet device (MID), a wearable device or a vehicle-mounted device.

Figure 2:
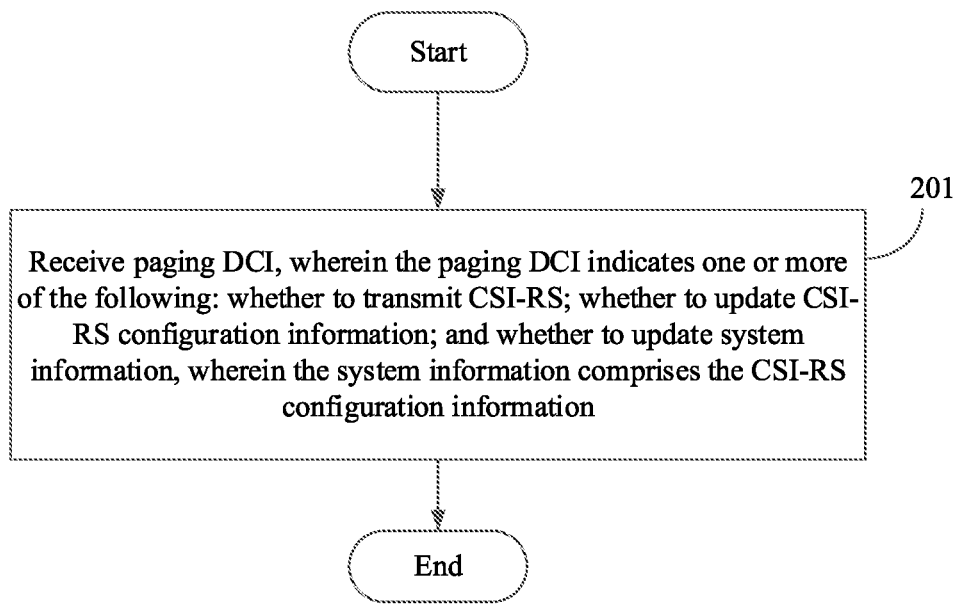
FIG. 2 is one of flowcharts of a CSI-RS indicating method according to an embodiment of the present disclosure.

Referring to FIG. 2, the embodiments of the present disclosure further provide a CSI-RS indicating method. The method may be performed by a terminal and specifically includes: step 201.

Step 201: receiving paging DCI, wherein the paging DCI indicates one or more of the following: (1) whether to transmit CSI-RS; (2) whether to update CSI-RS configuration information; and (3) whether to update system information, wherein the system information includes the CSI-RS configuration information.

It may be understood that the paging DCI may also be referred to DCI transmitted by a paging PDCCH, and the paging PDCCH is a PDCCH using a paging-radio network temporary identity (P-RNTI) to perform cyclic redundancy check (CRC) scrambling. The system information may be a system information block 1 (SIB1) or a system information block x (SIBx, x>1), that is, the specific form of the system information is not limited in the embodiments of the present disclosure.

In some implementation manners, in the step 201, paging DCI is received in an idle state or inactive state. Of course, it may be understood that the state of the terminal is not limited in the embodiments of the present disclosure, and in the step 201, the terminal in a connected state may receive paging DCI.

In some implementation manners, after the step 201, the method further includes: in a case that the paging DCI indicates to transmit CSI-RS, receiving the CSI-RS; or in a case that the paging DCI indicates not to transmit CSI-RS, not receiving the CSI-RS; or in a case that the paging DCI indicates to transmit CSI-RS and the CSI-RS is on a flexible symbol, not receiving the CSI-RS on the flexible symbol.

In some implementation manners, the whether to transmit CSI-RS includes at least one of the following:
(1) whether to transmit CSI-RS in at least one CSI-RS resource configured by a network;
(2) whether to transmit CSI-RS in at least one CSI-RS resource set configured by a network;

(3) whether to transmit CSI-RS in at least one CSI-RS resource group configured by a network, wherein at least one CSI-RS resource is included in one resource group; and (4) whether to transmit CSI-RS in at least one CSI-RS resource set group configured by a network, wherein at least one CSI-RS resource set is included in one CSI-RS resource set group.

In some implementation manners, the CSI-RS resource, the CSI-RS resource set, the CSI-RS resource group or the CSI-RS resource set group may be configured through system information. For example, before the step 201, the method further includes: receiving system information, wherein the system information is used to configure at least one of the following:

(1) at least one CSI-RS resource;
(2) at least one CSI-RS resource set;
(3) at least one CSI-RS resource group; and
(4) at least one CSI-RS resource set group.

In some implementation manners, a network side may indicate the application of the CSI-RS resource, the CSI-RS resource set, the CSI-RS resource group or the CSI-RS resource set group through the system information. For example, before the step 201, the system formation is received, wherein the system information indicates at least one of the following:

(1) the application of the at least one CSI-RS resource;
(2) the application of the at least one CSI-RS resource set;
(3) the application of the at least one CSI-RS resource group; and
(4) the application of the at least one CSI-RS resource set group.

Further, the application includes at least one of the following (a) to (g): (a) CSI measurement; (b) radio link management (RLM); (c) beam failure detection (BFD); (d) beam management; (e) synchronization; (f) tracking; and (g) positioning.

In some implementation manners, that paging DCI indicates whether to transmit CSI-RS may take effect within the current system information updating cycle, or may also take effect within the subsequent system information updating cycle, that is, the effective time when paging DCI indicates whether to transmit CSI-RS is not limited in the embodiments of the present disclosure.

For example, in the step 201, the paging DCI is received within the first time period, and the paging DCI indicates whether to transmit CSI-RS; and according to the paging DCI, it is determined whether to transmit the CSI-RS within the second time period, wherein the first time period and the second time period each represents one system information updating cycle, and the first time period and the second time period are the same time period or different time periods.

It may be understood that the system information updating cycle means that the system information is updated within this cycle. That the first time period and the second time period are the same time period may be understood that the first time period and the second time period correspond to the same system information updating cycle.

That the first time period and the second time period are different time periods includes: the second time period is a time period after the first time period, optionally, the second time period may be a next time period of the first time period. For example: the first time period corresponds to a first system information updating cycle, and the second time period corresponds to a second system information updating period.

CSI-RS in the related network belongs to the configuration of a connected state and only can support UE in the connected state. In a case that the CSI-RS serving the UE in the connected state to the UE in the idle state through the system information, it is unnecessary to continuously transmit a certain CSI-RS for the UE in the connected state in the network or a certain CSI-RS may be newly configured for idle UE. In the embodiments of the present disclosure, it may indicate to update CSI-RS configuration information through paging DCI or indicate to update system information including CSI-RS configuration information.

In some implementation manners, after the step 201, the method may further include:

in a case that the paging DCI indicates to update CSI-RS configuration information, receiving system information including new CSI-RS configuration information; and acquiring the new CSI-RS configuration information from the system information. Further, CSI-RS is received according to the new CSI-RS configuration information.

For example, SIBx contains CSI-RS configuration information, in a case that the paging DCI indicates to update CSI-RS configuration information, SIBx including new CSI-RS configuration information is received; and the new CSI-RS configuration information is acquired from the SIBx, for example, x is greater than or equal to 1.

In some other implementation manners, after the step 201, the method may further include:

in a case that the paging DCI indicates to update system information, receiving the updated system information; and acquiring new CSI-RS configuration information from the updated system information. Further, CSI-RS is received according to the new CSI-RS configuration information.

For example, SIBx contains CSI-RS configuration information, in a case that the paging DCI indicates to update SIBx, the updated SIBx is received; and the new CSI-RS configuration information is acquired from the updated SIBx, for example, x is greater than or equal to 1.

In some other implementation manners, after the step 201, the method may further include:

in a case that the paging DCI indicates to update system information, receiving the updated system information, wherein the updated system information indicates to transmit a resource index of CSI-RS; and receiving the CSI-RS according to the resource index.

For example, SIB1 contains CSI-RS configuration information, in a case that the paging DCI indicates to update SIB1, receiving the updated SIB1, wherein the updated SIB1 indicates to transmit the resource index of the CSI-RS; and receiving the CSI-RS according to the resource index.

In some implementation manners, the paging DCI may include: a first field, wherein bits in the first field indicate one or more of the following:

(1) whether to update the CSI-RS configuration information;
(2) whether to update the system information;
(3) whether to transmit CSI-RS in a CSI-RS resource;
(4) whether to transmit CSI-RS in a CSI-RS resource group;
(5) whether to transmit CSI-RS in a CSI-RS resource set; and
(6) whether to transmit CSI-RS in a CSI-RS resource set group.

For example, when a first bit in the first field indicates 1, the first bit indicates to update the CSI-RS configuration information or indicates to update the system information; or when a second bit in the first field indicates 1, the second bit indicates to transmit CSI-RS in the CSI-RS resource, CSI-RS resource group, CSI-RS resource set or CSI-RS resource set group (configured by the terminal).

Optionally, the first field may be a short messages indicator field, a short messages field, a frequency domain resource assignment field, a time domain resource assignment field, a virtual resource block to physical resource block mapping (VRB-to-PRB mapping) field, a modulation and coding scheme field, a transmission block scaling (TB scaling) field, or a reserved bits field.

For example, the first bit or the second bit may be other bits than the first 3 bits of the short message field, and the bit number of the first bit or the second bit may be 1 bit or a plurality of bits, which is not specifically limited in the embodiments of the present disclosure.

In the embodiments of the present disclosure, the terminal may determine whether to update CSI-RS or whether to update CSI-RS configuration information according to the received paging DCI; in a case that the paging DCI indicates to transmit CSI-RS, the terminal may receive the CSI-RS; in a case that the paging DCI indicates to update CSI-RS configuration information, the terminal acquires the updated CSI-RS configuration information and receives CSI-RS according to the updated CSI-RS configuration information, so that after the terminal receives the CSI-RS, the CSI-RS may be used to complete CSI measurement, radio resource management measurement, radio link measurement, beam failure detection, beam management, automatic gain control and the like.

Figure 3:
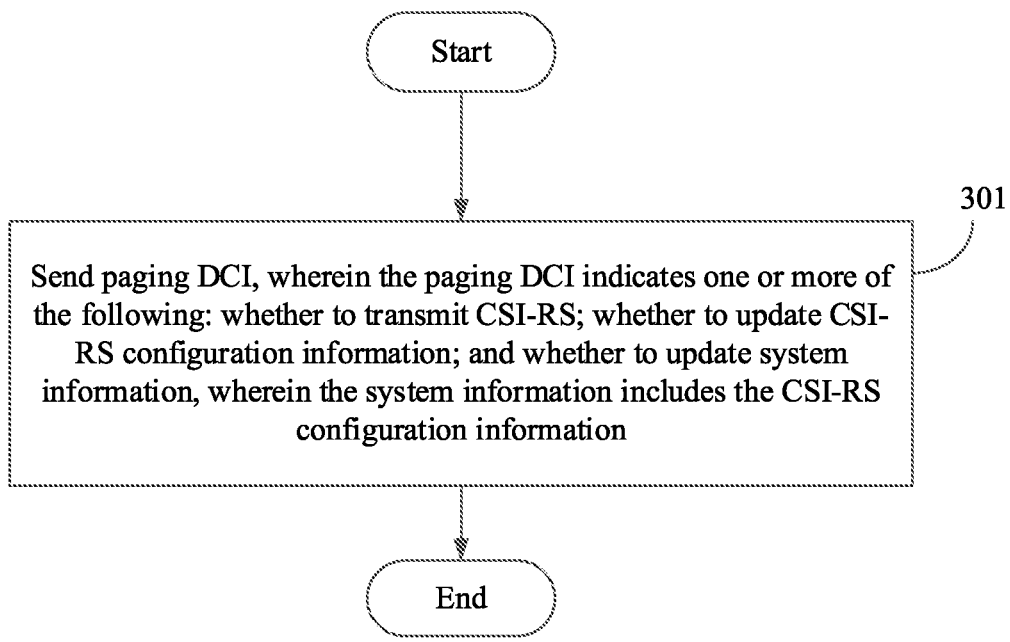
FIG. 3 is one of flowcharts of a CSI-RS indicating method according to an embodiment of the present disclosure.

Referring to FIG. 3, the embodiments of the present disclosure further provide a CSI-RS indicating method. The method may be performed by a network device and specifically includes: step 301.

Step 301: sending paging DCI, wherein the paging DCI indicates one or more of the following: (1) whether to transmit CSI-RS; (2) whether to update CSI-RS configuration information; and (3) whether to update system information, wherein the system information includes the CSI-RS configuration information.

In some implementation manners, in the step 301, the network device may send paging DCI to a terminal in an idle state or inactive state or connected state.

In some implementation manners, that paging DCI indicates whether to transmit CSI-RS may take effect within the current system information updating cycle, or may also take effect within the subsequent system information updating cycle, that is, the effective time when paging DCI indicates whether to transmit CSI-RS is not limited in the embodiments of the present disclosure.

In some implementation manners, the whether to transmit CSI-RS includes at least one of the following:
(1) whether to transmit CSI-RS in at least one CSI-RS resource configured by a network;
(2) whether to transmit CSI-RS in at least one CSI-RS resource set configured by a network;
(3) whether to transmit CSI-RS in at least one CSI-RS resource group configured by a network, wherein at least one CSI-RS resource is included in one resource group; and
(4) whether to transmit CSI-RS in at least one CSI-RS resource set group configured by a network, wherein at least one CSI-RS resource set is included in one CSI-RS resource set group.

In some implementation manners, the CSI-RS resource, the CSI-RS resource set, the CSI-RS resource group or the CSI-RS resource set group may be configured through system information. For example, before the step 301, system information is sent, wherein the system information is used to configure at least one of the following:
(1) the at least one CSI-RS resource;
(2) the at least one CSI-RS resource set;
(3) the at least one CSI-RS resource group; and
(4) the at least one CSI-RS resource set group.

In some implementation manners, a network side may indicate the application of the CSI-RS resource, the CSI-RS resource set, the CSI-RS resource group or the CSI-RS resource set group through the system information. For example, the system formation is sent, wherein the system information indicates at least one of the following:
(1) the application of the at least one CSI-RS resource;
(2) the application of the at least one CSI-RS resource set;
(3) the application of the at least one CSI-RS resource group; and
(4) the application of the at least one CSI-RS resource set group.

Further, the application includes at least one of the following (a) to (g): (a) CSI measurement; (b) RLM; (c) BFD; (d) beam management; (e) synchronization; (f) tracking; and (g) positioning.

In some implementation manners, after the step 301, the method may further include:
in a case that the paging DCI indicates to update CSI-RS configuration information, sending system information including new CSI-RS configuration information.

For example, SIBx contains CSI-RS configuration information, in a case that the paging DCI indicates to update CSI-RS configuration information, SIBx of new CSI-RS configuration information is sent, and a terminal may acquire new CSI-RS configuration information from the updated SIBx after receiving the updated SIBx.

In some other implementation manners, after the step 301, the method may further include:
in a case that the paging DCI indicates to update system information, sending the updated system information.

For example, SIBx contains CSI-RS configuration information, in a case that the paging DCI indicates to update SIBx, the updated SIBx is sent, and a terminal may acquire new CSI-RS configuration information from the updated SIBx after receiving the updated SIBx, for example, x is greater than or equal to 1.

In some other implementation manners, after the step 301, the method may further include:
in a case that the paging DCI indicates to update system information, sending the updated system information, wherein the updated system information indicates to transmit a resource index of CSI-RS.

For example, SIB1 includes CSI-RS configuration information, in a case that the paging DCI indicates to update SIB1, the updated SIB1 is sent, the updated SIB1 indicates to transmit a resource index of CSI-RS, and the terminal may receive the CSI-RS according to the resource index after receiving the updated SIB1.

In some implementation manners, the paging DCI may include: a first field, wherein bits in the first field indicate one or more of the following:
(1) whether to update the CSI-RS configuration information;
(2) whether to update the system information;
(3) whether to transmit CSI-RS in a CSI-RS resource;
(4) whether to transmit CSI-RS in a CSI-RS resource group;
(5) whether to transmit CSI-RS in a CSI-RS resource set; and (6) whether to transmit CSI-RS in a CSI-RS resource set group.

For example, the first bit in the first field indicates 1, the first bit indicates to update the CSI-RS configuration information or indicates to update the system information; or when a second bit in the first field indicates 1, the second bit indicates to transmit CSI-RS in the configured CSI-RS resource, CSI-RS resource group, CSI-RS resource set or CSI-RS resource set group.

Optionally, the first field may be a short messages indicator field, a short messages field, a frequency domain resource assignment field, a time domain resource assignment field, a virtual resource block to physical resource block mapping (VRB-to-PRB mapping) field, a modulation and coding scheme field, a transmission block scaling (TB scaling) field, or a reserved bits field.

For example, the first bit or the second bit may be other bits than the first 3 bits of the short message field, and the bit number of the first bit or the second bit may be 1 bit or a plurality of bits, which is not specifically limited in the embodiments of the present disclosure.

In the embodiments of the present disclosure, the terminal may determine whether to update CSI-RS or whether to update CSI-RS configuration information according to the received paging DCI; in a case that the paging DCI indicates to transmit CSI-RS, the terminal may receive the CSI-RS; in a case that the paging DCI indicates to update CSI-RS configuration information, the terminal acquires the updated CSI-RS configuration information and receives CSI-RS according to the updated CSI-RS configuration information, so that after the terminal receives the CSI-RS, the CSI-RS may be used to complete CSI measurement, radio resource management measurement, radio link measurement, beam failure detection, beam management, automatic gain control and the like.

The solution of CSI-RS indication is introduced below in combination with the embodiment 1, embodiment 2, embodiment 3 and embodiment 4.

Embodiment 1

A network configures M CSI-RS resources or CSI-RS resource sets through system information, and indicates whether to transmit M CSI-RS resources or CSI-RS resource sets through bits in DCI transmitted by a paging PDCCH (paging DCI for short); in a case that transmission is indicated, UE determines that the network transmits M CSI-RS resources or CSI-RS resource sets, and UE may receive M CSI-RS resources or CSI-RS resource sets; and in case that no transmission is indicated, UE determines that the network does not transmit M CSI-RS resources or CSI-RS resource sets, and UE does not receive M CSI-RS resources or CSI-RS resource sets.

(1) Paging DCI Indicates Whether to Transmit One CSI-RS Resource (or CSI-RS Resource Set).

The network may configure one CSI-RS resource (or CSI-RS resource set), and indicate whether to transmit the CSI-RS resource (or CSI-RS resource set) in a CSI-RS resource group (or CSI-RS resource set group) through paging DCI.

(2) Paging DCI Indicates Whether to Transmit Each CSI-RS Resource (or CSI-RS Resource Set).

The network may configure M CSI-RS resources (or CSI-RS resource sets), and indicate whether to transmit each CSI-RS resource (or CSI-RS resource set) in M CSI-RS resources (or CSI-RS resource sets) through paging DCI, for example, the $m^{th}$ bit ($1=<m<=M$) is used to indicate whether to transmit the $m^{th}$ resource (or CSI-RS resource set).

(3) Paging DCI Indicates Whether to Transmit Each Group of CSI-RS Resources (or CSI-RS Resource Sets).

The network may configure M CSI-RS resources (or CSI-RS resource sets), the M resources (or CSI-RS resource sets) are divided into N groups, and each group includes at least one CSI-RS resource (or CSI-RS resource set). Paging DCI indicates whether to transmit the CSI-RS resource (CSI-RS resource set) in each CSI-RS resource group (or CSI-RS resource set group) in N groups, for example, the $n^{th}$ bit ($1=<n<=N$) is used to indicate whether to transmit the $n^{th}$ CSI-RS resource (CSI-RS resource set) group.

(4) Paging DCI Indicates Whether to Transmit All CSI-RS Resources.

The network may indicate whether to transmit all configured CSI-RS resources through bits or codepoints in the paging DCI.

In a case that UE receives the indication of the paging DCI that the network transmits these CSI-RS resources, UE may receive these CSI-RS resources, otherwise, UE may not receive these CSI-RS.

Embodiment 2

In a case that a system information updating cycle is X milliseconds (ms), the paging DCI received by UE within Xms indicates whether to transmit CSI-RS, the indication of the paging DCI whether to transmit CSI-RS takes effect in the next system information updating cycle, that is, it is determined whether to transmit CSI-RS according to the received paging DCI in the next system information updating cycle.

Embodiment 3

The network indicates to update CSI-RS configuration information through bits in paging DCI.

Optionally, it indicates to update CSI-RS configuration information through 1 bit information in short message.

After UE receives paging DCI which indicates to update CSI-RS configuration information, UE receives the system information transmitting updated CSI-RS configuration, for example, CSI-RS configuration information is transmitted in SIBx, then after UE receives the paging DCI, UE receives SIBx to acquire updated CSI-RS configuration information.

For example, SIBx may be SIB1 or SIB10, which is certainly not limited thereto.

Embodiment 4

The network transmits CSI-RS indication (equivalent to first configuration information) and CSI-RS configuration (equivalent to second configuration information) in the system information. The CSI-RS configuration refers to: CSI-RS configuration information may be transmitted in an idle state; and the CSI-RS indication may be index information of the CSI-RS resource.

In a case that the first configuration information indicates the source indicates of the transmitted CSI-RS, CSI-RS is received according to the corresponding second configuration information.

For example, the first configuration information and the second configuration information may be transmitted in different system information. For example, the first configuration information is transmitted in SIB1, and the second configuration information is transmitted in other SIB, (for example, SIBx, x is greater than 1).

In a case that the network needs to change whether to transmit CSI-RS, system information may be updated through the indication of paging DCI, UE receives SIB1, it may determine which CSI-RS to transmit according to the CSI-RS index indicated by the first configuration information in SIB1, and UE receives the corresponding CSI-RS according to the indication of SIB1.

Figure 4:
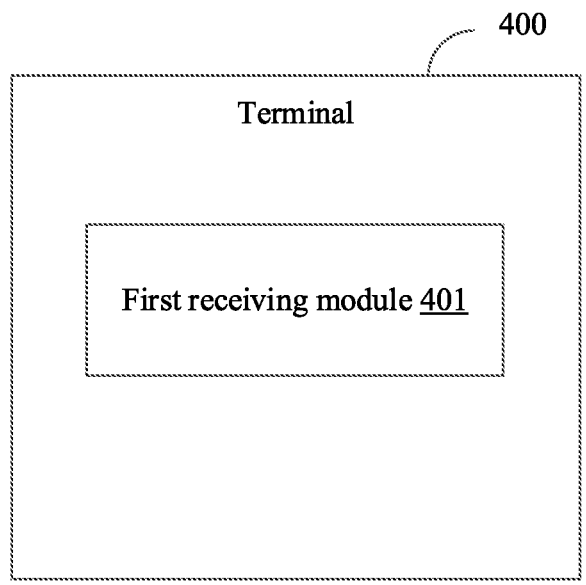
FIG. 4 is a schematic diagram of a network device according to an embodiment of the present disclosure.

As shown in FIG. 4, the embodiments of the present disclosure further provide a terminal. The terminal 400 includes:

a first receiving module 401, configured to receive paging DCI, wherein the paging DCI indicates one or more of the following: (1) whether to transmit CSI-RS; (2) whether to update CSI-RS configuration information; and (3) whether to update system information, wherein the system information includes the CSI-RS configuration information.

In some implementation manners, the terminal 400 further includes: a second receiving module, configured to: in a case that the paging DCI indicates to transmit CSI-RS, receive the CSI-RS; or in a case that the paging DCI indicates not to transmit CSI-RS, not receive the CSI-RS; or in a case that the paging DCI indicates to transmit CSI-RS and the CSI-RS is on a flexible symbol (flexible symbol), not receive the CSI-RS on the flexible symbol.

In some implementation manners, the whether to transmit CSI-RS includes at least one of the following:
(1) whether to transmit CSI-RS in at least one CSI-RS resource configured by a network;
(2) whether to transmit CSI-RS in at least one CSI-RS resource set (resource set) configured by a network;
(3) whether to transmit CSI-RS in at least one CSI-RS resource group configured by a network; and
(4) whether to transmit CSI-RS in at least one CSI-RS resource set group (resource set group) configured by a network.

In some implementation manners, the terminal 400 further includes: a third receiving module, configured to receive system information, wherein the system information is used to configure at least one of the following: (1) the at least one CSI-RS resource; (2) the at least one CSI-RS resource set; (3) the at least one CSI-RS resource group; and (4) the at least one CSI-RS resource set group.

In some implementation manners, the terminal 400 further includes: a fourth receiving module, configured to receive system information, wherein the system information indicates at least one of the following: (1) the application of the at least one CSI-RS resource; (2) the application of the at least one CSI-RS resource set; (3) the application of the at least one CSI-RS resource group; and (4) the application of the at least one CSI-RS resource set group.

Further, the application includes at least one of the following (a) to (g): (a) CSI measurement; (b) RLM; (c) BFD; (d) beam management; (e) synchronization; (f) tracking; and (g) positioning.

In some implementation manners, the first receiving module 401 is further configured to: receive the paging DCI within a first time period, wherein the paging DCI indicates whether to transmit CSI-RS; and the terminal 400 further includes: a determination module, configured to, according to the paging DCI, determine whether to transmit the CSI-RS within a second time period, wherein the first time period and the second time period each corresponds to one system information updating cycle, and the first time period and the second time period are the same time period or different time periods.

That the first time period and the second time period are the same time period may be understood that the first time period and the second time period correspond to the same system information updating cycle.

That the first time period and the second time period are different time periods includes: the second time period is a time period after the first time period, optionally, the second time period may be a next time period of the first time period. For example: the first time period corresponds to a first system information updating cycle, and the second time period corresponds to a second system information updating period.

In some implementation manners, the terminal 400 further includes: a fifth receiving module, configured to: in a case that the paging DCI indicates to update CSI-RS configuration information, receive system information including new CSI-RS configuration information; acquire the new CSI-RS configuration information from the system information, and receive CSI-RS according to the new CSI-RS configuration information; or in a case that the paging DCI indicates to update system information, receive the updated system information; acquire new CSI-RS configuration information from the updated system information, and receive CSI-RS according to the new CSI-RS configuration information; or in a case that the paging DCI indicates to update system information, receiving the updated system information, wherein the updated system information indicates to transmit a resource index of CSI-RS; and according to the resource index, receive the CSI-RS.

In some implementation manners, the paging DCI may include: a first field, wherein bits in the first field indicate one or more of the following:
(1) whether to update the CSI-RS configuration information;
(2) whether to update the system information;
(3) whether to transmit CSI-RS in a CSI-RS resource;
(4) whether to transmit CSI-RS in a CSI-RS resource group;
(5) whether to transmit CSI-RS in a CSI-RS resource set; and
(6) whether to transmit CSI-RS in a CSI-RS resource set group.

For example, the first bit in the first field indicates 1, the first bit indicates to update the CSI-RS configuration information or indicates to update the system information; or when a second bit in the first field indicates 1, the second bit indicates to transmit CSI-RS in the configured CSI-RS resource, CSI-RS resource group, CSI-RS resource set or CSI-RS resource set group.

Optionally, the first field may be a short messages indicator field, a short messages field, a frequency domain resource assignment field, a time domain resource assignment field, a VRB-to-PRB mapping field, a modulation and coding scheme field, a TB scaling field, or a reserved bits field.

For example, the first bit or the second bit may be other bits than the first 3 bits of the short message field, and the bit number of the first bit or the second bit may be 1 bit or a plurality of bits, which is not specifically limited in the embodiments of the present disclosure.

The terminal provided in this embodiment of the present disclosure may perform the foregoing method embodiment shown in FIG. 2. An implementation principle and a technical effect of the terminal are similar to those of the method embodiment, and details are not described again in this embodiment.

Figure 5:
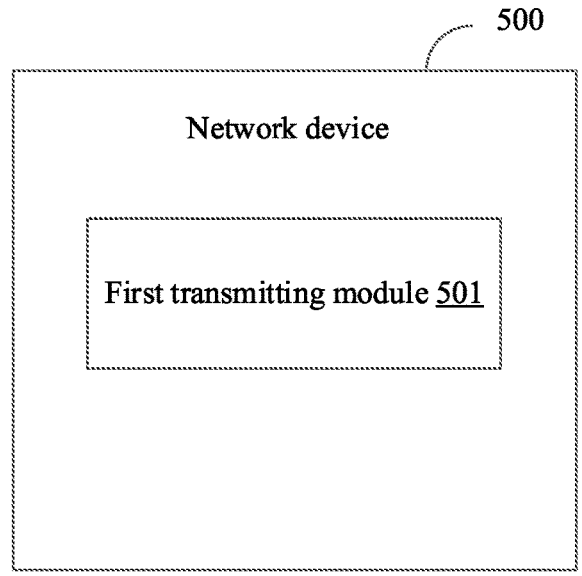
FIG. 5 is a schematic diagram of a terminal according to an embodiment of the present disclosure.

Referring to FIG. 5, the embodiments of the present disclosure provide a network device. The network device 500 includes:

a first sending module 501, configured to send paging DCI, wherein the paging DCI indicates one or more of the following: (1) whether to transmit CSI-RS; (2) whether to update CSI-RS configuration information; and (3) whether to update system information, wherein the system information includes the CSI-RS configuration information.

In some implementation manners, that paging DCI indicates whether to transmit CSI-RS may take effect within the current system information updating cycle, or may also take effect within the subsequent system information updating cycle, that is, the effective time when paging DCI indicates whether to transmit CSI-RS is not limited in the embodiments of the present disclosure.

In some implementation manners, the whether to transmit CSI-RS includes at least one of the following:
(1) whether to transmit CSI-RS in at least one CSI-RS resource configured by a network;
(2) whether to transmit CSI-RS in at least one CSI-RS resource set configured by a network;
(3) whether to transmit CSI-RS in at least one CSI-RS resource group configured by a network; and
(4) whether to transmit CSI-RS in at least one CSI-RS resource set group configured by a network.

In some implementation manners, the terminal 500 further includes: a second sending module, configured to send system information, wherein the system information is used to configure at least one of the following: (1) the at least one CSI-RS resource; (2) the at least one CSI-RS resource set; (3) the at least one CSI-RS resource group; and (4) the at least one CSI-RS resource set group.

In some implementation manners, the terminal 500 further includes: a third sending module, configured to send system information, wherein the system information indicates at least one of the following: (1) the application of the at least one CSI-RS resource; (2) the application of the at least one CSI-RS resource set; (3) the application of the at least one CSI-RS resource group; and (4) the application of the at least one CSI-RS resource set group.

Further, the application includes at least one of the following (a) to (g): (a) CSI measurement; (b) RLM; (c) BFD; (d) beam management; (e) synchronization; (f) tracking; and (g) positioning.

In some implementation manners, the terminal 500 further includes: a fourth sending module, configured to: in a case that the paging DCI indicates to update CSI-RS configuration information, send system information including new CSI-RS configuration information; or in a case that the paging DCI indicates to update system information, send the updated system information; or in a case that the paging DCI indicates to update system information, send the updated system information, wherein the updated system information indicates to transmit a resource index of CSI-RS.

In some implementation manners, the paging DCI may include: a first field, wherein bits in the first field indicate one or more of the following:
(1) whether to update the CSI-RS configuration information;
(2) whether to update the system information;
(3) whether to transmit CSI-RS in a CSI-RS resource;
(4) whether to transmit CSI-RS in a CSI-RS resource group;
(5) whether to transmit CSI-RS in a CSI-RS resource set; and
(6) whether to transmit CSI-RS in a CSI-RS resource set group.

For example, when a first bit in the first field indicates 1, the first bit indicates to update the CSI-RS configuration information or indicates to update the system information; or when a second bit in the first field indicates 1, the second bit indicates to transmit CSI-RS in the CSI-RS resource, CSI-RS resource group, CSI-RS resource set or CSI-RS resource set group (configured by the terminal).

Optionally, the first field may be a short messages indicator field, a short messages field, a frequency domain resource assignment field, a time domain resource assignment field, a VRB-to-PRB mapping field, a modulation and coding scheme field, a TB scaling field, or a reserved bits field.

For example, the first bit or the second bit may be other bits than the first 3 bits of the short message field, and the bit number of the first bit or the second bit may be 1 bit or a plurality of bits, which is not specifically limited in the embodiments of the present disclosure.

The network device provided in this embodiment of the present disclosure may perform the foregoing method embodiment shown in FIG. 3. An implementation principle and a technical effect of the network device are similar to those of the method embodiment, and details are not described again in this embodiment.

Figure 6:
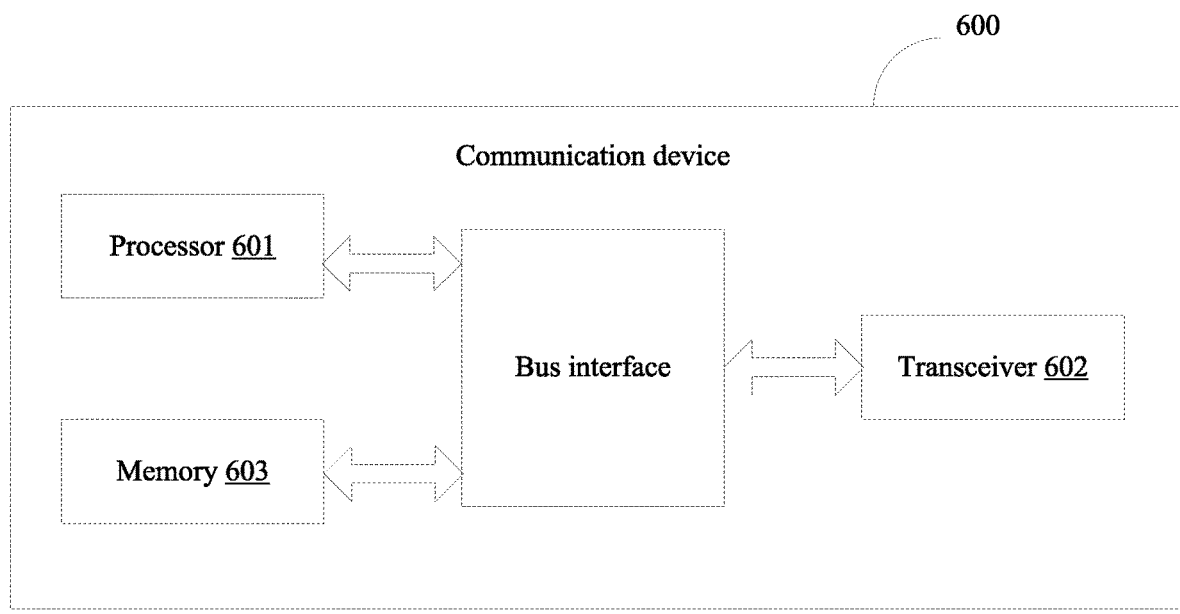
FIG. 6 is a schematic diagram of a network device according to an embodiment of the present disclosure.

As shown in FIG. 6, FIG. 6 is a structural diagram of a communications device applied to an embodiment of the present disclosure. As shown in FIG. 6, the communications device 600 includes a processor 601, a transceiver 602, a memory 603, and a bus interface. The processor 601 may be responsible for managing a bus architecture and normal processing. The memory 603 may store data used by the processor 601 when the processor performs an operation.

In an embodiment of the present disclosure, the communications device 600 further includes a program that is stored in the memory 603 and that may run on the processor 601. When the program is executed by the processor 601, steps in the method shown in FIG. 2 or FIG. 3 are implemented.

In FIG. 6, a bus architecture may include any number of interconnected buses and bridges. Specifically, various circuits of one or more processors represented by the processor 601 and a memory represented by the memory 603 are interconnected. The bus architecture may further link other various circuits such as a peripheral device, a voltage stabilizer, and a power management circuit. These are well known in the art, and therefore are not further described in this specification. The bus interface provides an interface. The transceiver 602 may be a plurality of elements, in other words, include a transmitter and a receiver, and provide a unit for communicating with other various apparatuses on a transmission medium.

The communication device provided in this embodiment of the present disclosure may execute the foregoing method embodiment shown in FIG. 2 or FIG. 3, and implementation principles and technical effects thereof are similar, and details are not described herein again in this embodiment.

The method or algorithm steps described in combination with content disclosed in the present disclosure may be implemented by hardware, or may be implemented by a processor by executing a software instruction. A software instruction may include a corresponding software module, and the software module may be stored in a random access memory (RAM), a flash memory, a read-only memory (ROM), an erasable PROM (EPROM), an electrically EPROM (EEPROM), a register, a hard disk, a mobile hard disk, a CD-ROM or any other form of storage medium well known in the art. An exemplary storage medium is coupled to the processor, so that the processor can read information from the storage medium and can write information to the storage medium. Certainly, the storage medium may also be a component of the processor. The processor and the storage medium may be located in an application specific integrated circuit (ASIC). In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of implementations. It should be understood that the foregoing descriptions are merely description of implementations of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures of the flowchart and/or in one or more blocks of the block diagram.

These computer program instructions may also be loaded onto a computer or another programmable data processing device, so that a series of operation steps are performed on the computer or other programmable devices to produce computer-implemented processing, thereby providing instructions executed on the computer or other programmable devices to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. A channel state information reference signal (CSI-RS) indicating method, applied to a terminal, wherein the method comprises:
   receiving paging downlink control information (DCI), wherein the paging DCI is transmitted by a paging Physical Downlink Control Channel (PDCCH), the paging PDCCH is a PDCCH using a paging-radio network temporary identity (P-RNTI) to perform cyclic redundancy check (CRC) scrambling, the paging DCI indicates whether to transmit CSI-RS,
   wherein the receiving paging DCI comprises: receiving the paging DCI within a first time period, wherein the paging DCI indicates whether to transmit CSI-RS; and
   the method further comprises:
   according to the paging DCI, determining whether to transmit the CSI-RS within a second time period,
   wherein the first time period and the second time period each corresponds to one system information updating cycle, and the first time period and the second time period are the same or different,
   wherein the paging DCI further indicates one or more of following:
      whether to update CSI-RS configuration information; or
      whether to update system information, the system information comprising the CSI-RS configuration information.

2. The method according to claim 1, wherein whether to transmit CSI-RS comprises at least one of the following:
   whether to transmit CSI-RS in at least one CSI-RS resource configured by a network;
   whether to transmit CSI-RS in at least one CSI-RS resource set configured by a network;
   whether to transmit CSI-RS in at least one CSI-RS resource group configured by a network; and
   whether to transmit CSI-RS in at least one CSI-RS resource set group configured by a network.

3. The method according to claim 2, further comprising:
receiving system information, wherein the system information is used to configure at least one of the following:
the at least one CSI-RS resource;
the at least one CSI-RS resource set;
the at least one CSI-RS resource group; and
the at least one CSI-RS resource set group.

4. The method according to claim 1, wherein that the first time period and the second time period are different comprises: the second time period is a time period after the first time period.

5. The method according to claim 1, wherein the paging DCI comprises: a first field, whether bits in the first field indicate one or more of the following:
whether to transmit CSI-RS in a CSI-RS resource;
whether to transmit CSI-RS in a CSI-RS resource group;
whether to transmit CSI-RS in a CSI-RS resource set; and
whether to transmit CSI-RS in a CSI-RS resource set group.

6. The method according to claim 5, wherein
when a second bit in the first field indicates 1, the second bit indicates to transmit CSI-RS in the configured CSI-RS resource, CSI-RS resource group, CSI-RS resource set or CSI-RS resource set group.

7. The method according to claim 1, wherein the receiving paging DCI comprises:
receiving the paging DCI in an idle state or an inactive state.

8. A channel state information reference signal (CSI-RS) indicating method, applied to a network device, wherein the method comprises:
sending paging downlink control information (DCI), wherein the paging DCI is transmitted by a paging Physical Downlink Control Channel (PDCCH), the paging PDCCH is a PDCCH using a paging-radio network temporary identity (P-RNTI) to perform cyclic redundancy check (CRC) scrambling, the paging DCI indicates
whether to transmit CSI-RS;
wherein the sending the paging DCI comprises: sending the paging DCI within a first time period, wherein the paging DCI indicates whether to transmit CSI-RS; and
wherein the paging DCI is used by the terminal to determine whether to transmit the CSI-RS within a second time period,
wherein the first time period and the second time period each corresponds to one system information updating cycle, and the first time period and the second time period are the same or different,
wherein the paging DCI further indicates one or more of following:
whether to update CSI-RS configuration information; or
whether to update system information, the system information comprising the CSI-RS configuration information.

9. The method according to claim 8, wherein whether to transmit CSI-RS comprises at least one of the following:
whether to transmit CSI-RS in at least one CSI-RS resource configured by a network;
whether to transmit CSI-RS in at least one CSI-RS resource set configured by a network;
whether to transmit CSI-RS in at least one CSI-RS resource group configured by a network; and
whether to transmit CSI-RS in at least one CSI-RS resource set group configured by a network.

10. The method according to claim 8, further comprising:
sending system information, wherein the system information is used to configure at least one of the following:
the at least one CSI-RS resource;
the at least one CSI-RS resource set;
the at least one CSI-RS resource group; and
the at least one CSI-RS resource set group.

11. The method according to claim 8, wherein the paging DCI comprises: a first field, whether bits in the first field indicate one or more of the following:
whether to transmit CSI-RS in a CSI-RS resource;
whether to transmit CSI-RS in a CSI-RS resource group;
whether to transmit CSI-RS in a CSI-RS resource set; and
whether to transmit CSI-RS in a CSI-RS resource set group.

12. The method according to claim 11, wherein when a second bit in the first field indicates 1, the second bit indicates to transmit CSI-RS in the configured CSI-RS resource, CSI-RS resource group, CSI-RS resource set or CSI-RS resource set group.

13. The method according to claim 8, wherein the sending paging DCI comprises:
sending the paging DCI in an idle state or an inactive state.

14. A communication device, comprising: a processor, a memory, and a program stored in the memory and capable of running on the processor, wherein when the program is executed by the processor, the steps of the CSI-RS indicating method is implemented, the method comprises:
receiving paging downlink control information (DCI), wherein the paging DCI is transmitted by a paging Physical Downlink Control Channel (PDCCH), the paging PDCCH is a PDCCH using a paging-radio network temporary identity (P-RNTI) to perform cyclic redundancy check (CRC) scrambling, the paging DCI indicates whether to transmit CSI-RS,
wherein the receiving the paging DCI comprises: receiving the paging DCI within a first time period, wherein the paging DCI indicates whether to transmit CSI-RS; and
the method further comprises:
according to the paging DCI, determining whether to transmit the CSI-RS within a second time period,
wherein the first time period and the second time period each corresponds to one system information updating cycle, and the first time period and the second time period are the same or different,
wherein the paging DCI further indicates one or more of following:
whether to update CSI-RS configuration information; or
whether to update system information, the system information comprising the CSI-RS configuration information.

15. The communication device according to claim 14, wherein whether to transmit CSI-RS comprises at least one of the following:
whether to transmit CSI-RS in at least one CSI-RS resource configured by a network;
whether to transmit CSI-RS in at least one CSI-RS resource set configured by a network;
whether to transmit CSI-RS in at least one CSI-RS resource group configured by a network; and
whether to transmit CSI-RS in at least one CSI-RS resource set group configured by a network.

16. The communication device according to claim 14, wherein the receiving paging DCI comprises:

receiving the paging DCI in an idle state or an inactive state.

* * * * *